(12) United States Patent
Matsumoto et al.

(10) Patent No.: US 8,644,891 B2
(45) Date of Patent: Feb. 4, 2014

(54) VOICE COMMUNICATION APPARATUS CONNECTABLE TO WIRELESS LAN, RADIO CIRCUIT ACTIVATION METHOD, AND RADIO CIRCUIT ACTIVATION PROGRAM

(75) Inventors: Fumiaki Matsumoto, Higashiosaka (JP); Mitsuhiro Sugimori, Osaka (JP); Hiroshi Tsunoda, Kadoma (JP); Hideto Matsuyama, Katano (JP)

(73) Assignee: Kyocera Corporation, Kyoto (JP)

( * ) Notice: Subject to any disclaimer, the term of this patent is extended or adjusted under 35 U.S.C. 154(b) by 1493 days.

(21) Appl. No.: 11/942,345

(22) Filed: Nov. 19, 2007

(65) Prior Publication Data

US 2008/0119243 A1      May 22, 2008

(30) Foreign Application Priority Data

Nov. 20, 2006   (JP) ................................. 2006-313191

(51) Int. Cl.
    *H04M 1/00*       (2006.01)
(52) U.S. Cl.
     USPC ........ 455/574; 455/522; 455/277.2; 370/329; 714/751
(58) Field of Classification Search
     USPC ............. 455/574, 404.1, 277.2, 524, 527, 86, 455/466, 570, 522; 370/329, 335, 349; 379/45; 714/821, 751
     See application file for complete search history.

(56) References Cited

U.S. PATENT DOCUMENTS

| | | | | |
|---|---|---|---|---|
| 5,511,234 A | * | 4/1996 | Ha | ............................. 455/127.2 |
| 2002/0025839 A1 | | 2/2002 | Usui | |
| 2002/0085516 A1 | * | 7/2002 | Bridgelall | ...................... 370/329 |
| 2002/0137472 A1 | * | 9/2002 | Quinn et al. | ..................... 455/90 |
| 2003/0048768 A1 | | 3/2003 | Nakamura et al. | |
| 2008/0102843 A1 | * | 5/2008 | Todd et al. | ...................... 455/445 |
| 2008/0113692 A1 | * | 5/2008 | Zhao et al. | ..................... 455/574 |
| 2008/0133614 A1 | * | 6/2008 | Scott | ............................. 707/202 |

FOREIGN PATENT DOCUMENTS

| | | |
|---|---|---|
| GB | 2333424 | 7/1999 |
| JP | 2001-102997 | 4/2001 |
| JP | 2002-135203 A | 5/2002 |
| JP | 2004-297121 | 10/2004 |
| JP | 2004-320473 | 11/2004 |
| JP | 2005-295532 | 10/2005 |
| JP | 2006-25009 A | 1/2006 |
| JP | 2006-254442 | 9/2006 |
| KR | 2003-0022670 | 3/2003 |
| WO | WO-2004/114707 | 12/2004 |

OTHER PUBLICATIONS

Office Action issued by the Korean Intellectual Property Office, dated Mar. 26, 2009 (with English language translation), directed to patent application No. 10-2007-0110993.
Office Action from Chinese Patent Application No. 200710187038.4, dated Mar. 9, 2010, 12 pages.
Office Action from Japanese Patent Application No. 2006-313191, mailed on Feb. 8, 2011.

* cited by examiner

*Primary Examiner* — Mahendra Patel
(74) *Attorney, Agent, or Firm* — Duane Morris LLP (57) ABSTRACT

In order to reduce power consumption while an incoming call is detected by each of a plurality of communication methods, a mobile phone includes a radio circuit, a wireless LAN circuit, and a control portion to control power supply to them. The control portion cuts off power supply to the radio circuit when communication for a call by the wireless LAN circuit is established when power is supplied to both the radio circuit and the wireless LAN circuit.

18 Claims, 6 Drawing Sheets

(54) VOICE COMMUNICATION APPARATUS CONNECTABLE TO WIRELESS LAN, RADIO CIRCUIT ACTIVATION METHOD, AND RADIO CIRCUIT ACTIVATION PROGRAM

This application is based on Japanese Patent Application No. 2006-313191 filed with Japan Patent Office on Nov. 20, 2006 the entire content of which is hereby incorporated by reference.

BACKGROUND OF THE INVENTION

1. Field of the Invention

The present invention relates to a voice communication apparatus, a radio circuit activation method and a radio circuit activation program, and more particularly to a voice communication apparatus connectable to a wireless LAN, a radio circuit activation method performed in the voice communication apparatus and a radio circuit activation program.

2. Description of the Related Art

In recent years, IP telephones using IP (Internet Protocol) network such as the Internet in place of a public telephone network have emerged. IP network can be realized by a local area network using wireless communications (referred to as "wireless LAN" hereinafter). A mobile phone such as PDC (Personal Digital Cellular) or PHS (Personal Handyphone System) equipped with a communication circuit adapted to such a wireless LAN can be used as an IP telephone.

However, two kinds of communication circuits need to be provided on a mobile phone, thereby increasing power consumption. Since mobile phones are often driven by batteries, it is desired that power consumption is reduced as much as possible.

Furthermore, a voice communication method in a voice communication apparatus including a first radio circuit communication device and a second radio communication device is known. The voice communication method includes a sensing step of sensing an incoming call to said first radio communication device, a power supply step of supplying power to said second radio communication device when said call is sensed in said sensing step, a determination step of determining whether a communication by said second radio communication device receiving power in said power supply step is allowed or not, a selection step of selecting one of said first communication device and said second communication device based on a determination result in said determination step, and a callback step of making a callback by said first radio communication device or said second radio communication device selected in said selection step to the party on the other end whose call is sensed in said sensing step.

However, while the first radio communication device is in a standby state, the second radio communication device is powered off. Therefore, unfortunately, an incoming call cannot be detected in the second radio communication device.

SUMMARY OF THE INVENTION

In accordance with an aspect of the present invention, a voice communication apparatus includes: a first radio communication portion; a second radio communication portion different from the first radio communication portion; and a power control portion to control power supply to the first radio communication portion and the second radio communication portion. The power control portion includes a first cutoff portion to cut off power supply to the first radio communication portion if communication for a call by the second radio communication portion is established when power is supplied to both the first radio communication portion and the second radio communication portion.

In accordance with another aspect of the present invention, a radio circuit activation method is performed in a voice communication apparatus including a first radio communication portion and a second radio communication portion different from the first radio communication portion. The radio circuit activation method includes the steps of: detecting that communication for a call by the second radio communication portion is established; and cutting off power supply to the first radio communication portion if establishment of communication with the second radio communication portion is detected when power is supplied to both the first radio communication portion and the second radio communication portion.

In accordance with a further aspect of the present invention, a radio circuit activation program is executed in a computer for controlling a voice communication apparatus. The voice communication apparatus includes a first radio communication portion and a second radio communication portion different from the first radio communication portion. The radio circuit activation program includes the steps of: detecting that communication for a call by the second radio communication portion is established; and cutting off power supply to the first radio communication portion if establishment of communication with the second radio communication portion is detected when power is supplied to both the first radio communication portion and the second radio communication portion.

The foregoing and other objects, features, aspects and advantages of the present invention will become more apparent from the following detailed description of the present invention when taken in conjunction with the accompanying drawings.

DESCRIPTION OF THE PREFERRED EMBODIMENT

In the following, an embodiment of the present invention will be described with reference to the figures. In the following description, the same parts will be denoted with the same reference characters. Their designations and functions are also the same. Therefore, detailed description thereof will not be repeated.

Figure 1:
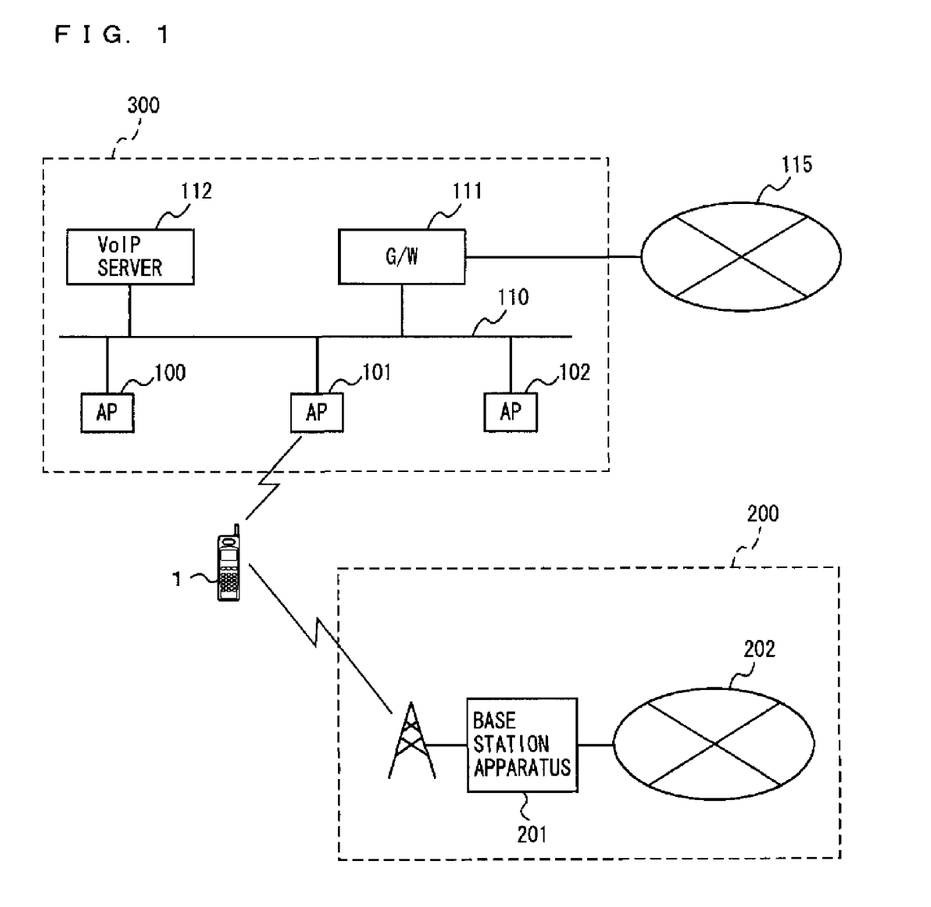
FIG. 1 is a diagram showing an overview of a communication system in the present embodiment.

FIG. 1 is a diagram showing an overview of a communication system in the present embodiment. Referring to FIG. 1, a communication system 10 includes a mobile phone system 200 and a wireless LAN system 300. Mobile phone system 200 is a system provided by a carrier and here includes, as an example, a communication network 202, a base station apparatus 201 connected to the communication network 202, and a mobile phone 1 as a voice communication apparatus wirelessly communicating with base station apparatus 201. Here, for the sake of illustration, one base station apparatus 201 is shown. However, the number of base station apparatuses is not limited as long as there are one or more. Base station apparatus 201 is a radio station apparatus which functions as a repeater of communication network 202. When located in a communicable range of base station apparatus 201, mobile phone 1 wirelessly communicates with base station apparatus 201 to be connected to communication network 202. Here, communication network 202 provided by a carrier is called a first network.

Wireless LAN system 300 includes mobile phone 1, three access points (AP) 100-102, a VoIP (Voice over Internet Protocol) server 112, and a gateway (G/W) 111. AP 100-102, VoIP server 112, and G/W 111 are each connected to a LAN cable 110 and constitute a second network over which data can be communicated with each other. Here, for the sake of illustration, three access points 100-102 are shown. However, the number of access points is not limited as long as there are one or more. Access points 100-102 are radio station apparatuses each functioning as a repeater in LAN. Mobile phone 1 can wirelessly communicate with any one of access points 100-102, and when wirelessly communicating with any one of access points 100-102, mobile phone 1 is connected to the second network to be able to communicate with VoIP server 112 and G/W 111.

The second network is connected to the Internet 115 through G/W 111. Therefore, mobile phone 1 can communicate with any other communication terminal connected to the Internet 115 while being connected to the second network.

VoIP server 112 mediates between mobile phone 1 and the other party's device each connected to the second network. The other party's device includes a computer connected to the second network, an IP phone and another mobile phone communicating with any one of access points 100-102. VoIP server 112 stores beforehand a user table in which apparatus identification information for identifying mobile phone 1 and an extension number assigned beforehand to that mobile phone 1 are associated with each other, and when mobile phone 1 is connected to the second network, VoIP server 112 associates the IP address assigned to mobile phone 1 with the extension number assigned to mobile phone 1. For example, a case where first apparatus identification information and a first extension number are assigned to a first mobile phone and second apparatus identification information and a second extension number are assigned to a second mobile phone will be described. When the first mobile phone is connected to the second network, a first IP address is assigned thereto by a DHCP (Dynamic Host Configuration Protocol) server and the first mobile phone obtains the first IP address from the DHCP server. Thereafter, when the first mobile phone makes a registration request to VoIP server 112 for the first IP address, VoIP server 112 associates the first extension number with the first IP address. Similarly, when the second mobile phone is connected to the second network, a second IP address is assigned thereto by the DHCP server and the second mobile phone obtains the second IP address from the DHCP server. Thereafter, when the second mobile phone makes a registration request to VoIP server 112 for the second IP address, VoIP server 112 associates the second extension number with the second IP address. The first mobile phone 1 transmits the second extension number to VoIP server 112, so that the VoIP server mediates between the first and second mobile phones to enable communication of IP packet between the first and second mobile phones. Thus, each of the first and second mobile phones functions as an IP phone, thereby enabling a call. Furthermore, the first mobile phone may transmit the second extension number to VoIP server 112 and obtain the second IP address assigned to the second mobile phone from the VoIP server, so that IP packet is communicated directly between the first mobile phone and the second mobile phone.

Figure 2:
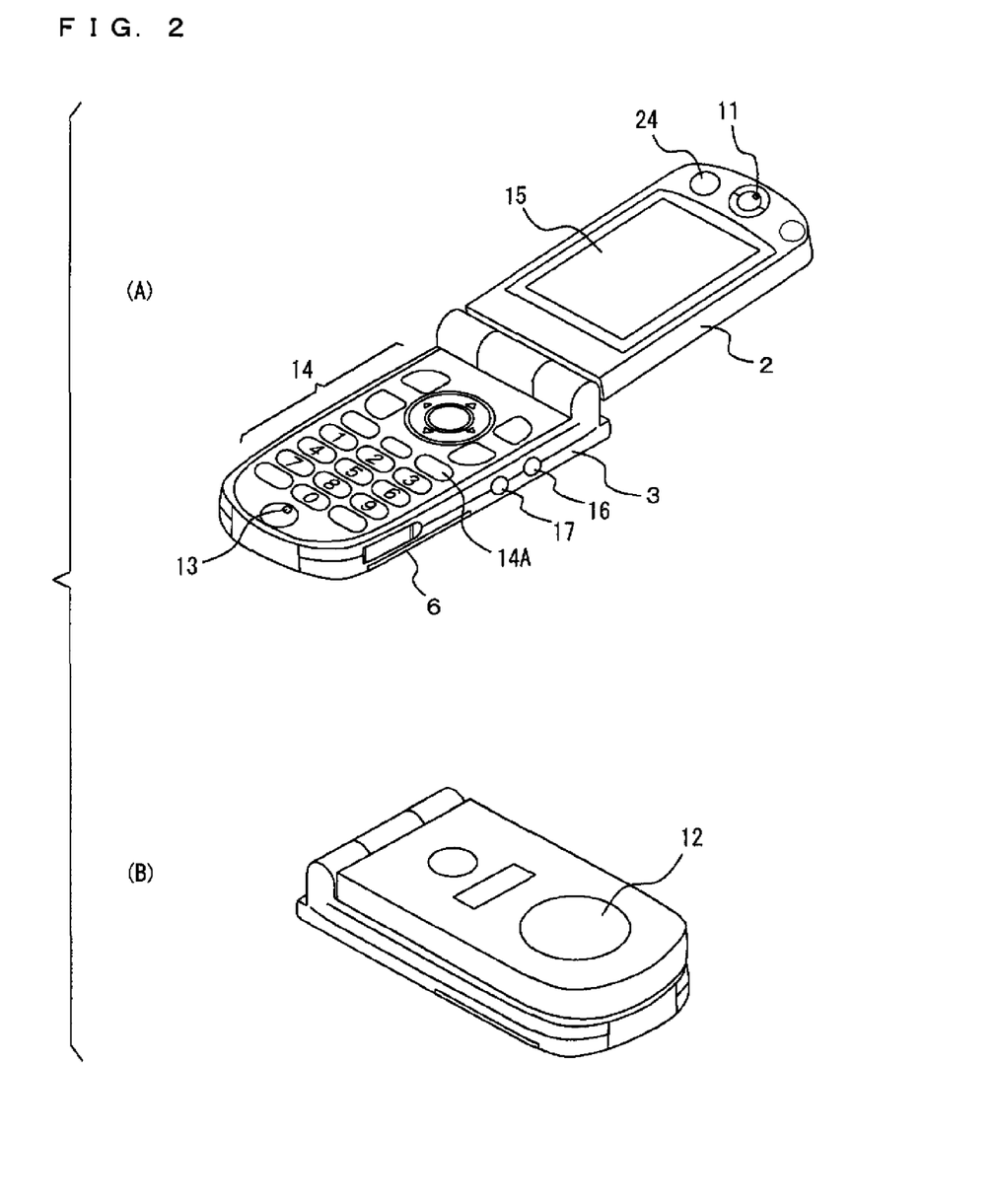
FIG. 2A and FIG. 2B are external perspective views of a mobile phone in an embodiment of the present invention.

FIG. 2A is an external perspective view showing a mobile phone in an open style and FIG. 2B is an external perspective view showing a mobile phone in a closed style. Referring to FIG. 2A and FIG. 2B, mobile phone 1 includes an operation-side portion 3 and a display-side portion 2. Operation-side portion 3 includes a power key 14A, operation keys 14 including ten keys, a call key and the like, and a microphone 13 on the inner surface thereof, and includes a microphone terminal 16 and an earphone terminal 17 on the right side surface thereof. Display-side portion 2 includes a liquid crystal display (LCD) 15, a first speaker 11 as a receiver, and a camera 24 on the inner side surface thereof, and includes a second speaker 12 on the outer surface thereof. Although here mobile phone 1 includes LCD 15 by way of example, LCD 15 may be replaced by an organic EL (Electro Luminescence) display. Operation-side portion 3 and display-side portion 2 are rotatably jointed to each other with a hinge mechanism so that operation-side portion 3 and display-side portion 2 can be opened and closed freely. When mobile phone 1 is folded and operation-side portion 3 and display-side portion 2 are in the closed state, mobile phone 1 is in the closed style. When mobile phone 1 is opened and operation-side portion 3 and display-side portion 2 are in the open state, mobile phone 1 is in the open style.

Figure 3:
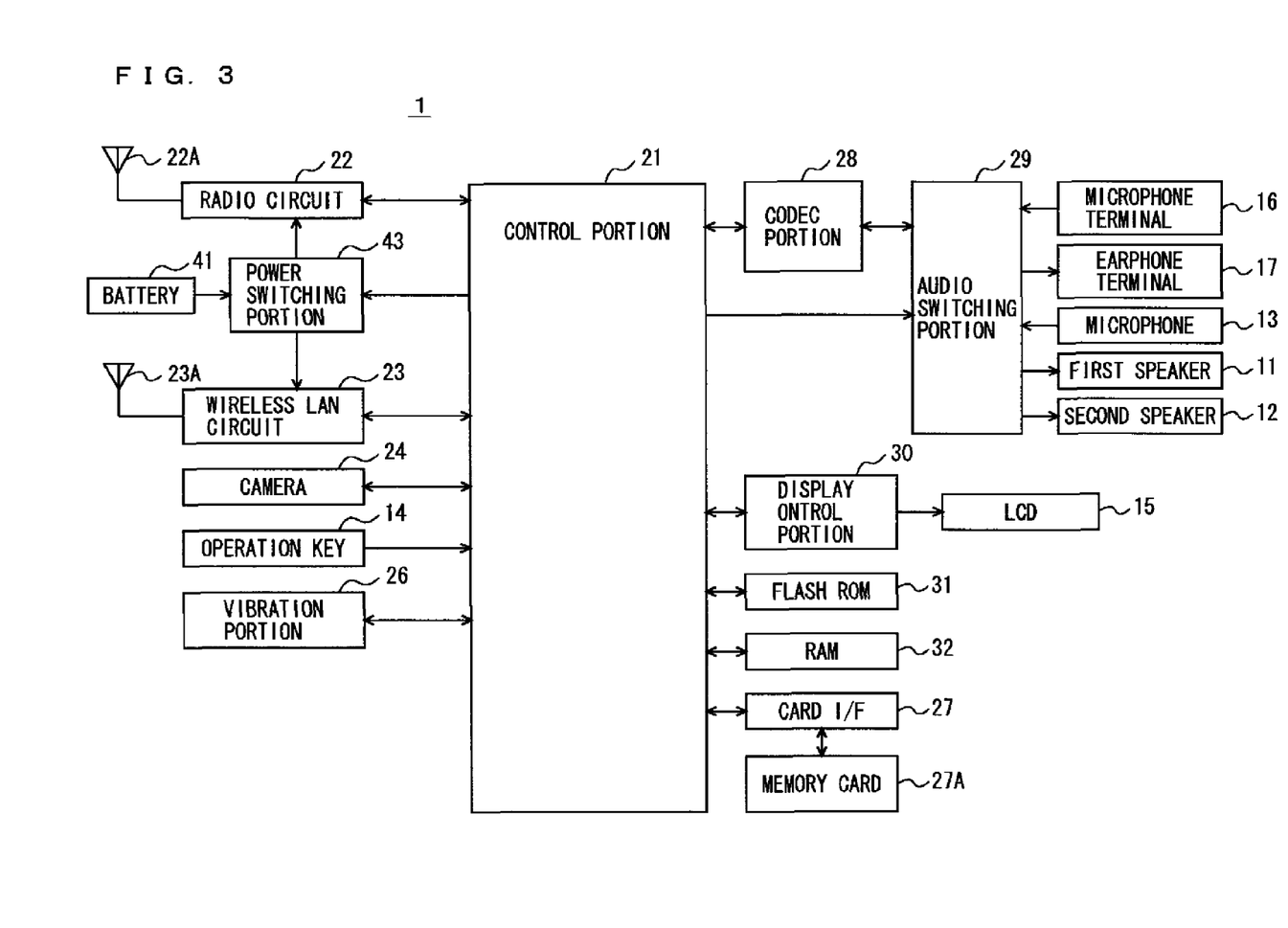
FIG. 3 is a functional block diagram showing an exemplary function of the mobile phone in the present embodiment.

FIG. 3 is a functional block diagram showing an exemplary function of the mobile phone in the present embodiment. Referring to FIG. 3, mobile phone 1 includes a control portion 21 for controlling the entire mobile phone 1, a radio circuit 22 connected to an antenna 22A, a wireless LAN circuit 23 connected to an antenna 23A, a battery 41 storing electricity, a power switching circuit 43 switching supply paths of battery power, a codec portion 28 for processing audio data, an audio switching portion 29 for switching input/output of codec portion 28, microphone 13, first speaker 11, second speaker 12, microphone terminal 16 and earphone terminal 17, each connected to audio switching portion 29, camera 24, operation keys 14 accepting an input of an operation by a user, a vibration portion 26, a display control portion 30 for controlling display on LCD 15, a flash ROM (Read Only Memory) 31 for storing a program executed in control portion 21, address book data, emails and the like, an RAM (Random Access Memory) 32 for use as a work area for control portion 21, and a card interface (I/F) 27.

Radio circuit 22 is controlled by control portion 21 and wirelessly communicates with base station apparatus 201 connected to communication network 202. A radio signal transmitted by base station apparatus 201 from an antenna is received by antenna 22A. Radio circuit 22 receives a radio signal received by antenna 22A and outputs an audio signal demodulated from the radio signal to codec portion 28. Furthermore, radio circuit 22 receives an audio signal from codec portion 28 and outputs a radio signal modulated from the audio signal to antenna 22A. The radio signal transmitted from antenna 22A is received by the antenna of base station apparatus 201 and output to base station apparatus 201.

Wireless LAN circuit 23 is controlled by control portion 21 and wirelessly communicates with any one of access points 100-102. A radio signal transmitted by any one of access points 100-102 is received by antenna 23A. Wireless LAN circuit 23 receives a radio signal received by antenna 23A and outputs an audio signal demodulated from the radio signal to codec portion 28. Furthermore, wireless LAN circuit 23 receives an audio signal from codec portion 28 and outputs a radio signal modulated from the audio signal to antenna 23A. The radio signal transmitted from antenna 23A is received by any one of access points 100-102. Communication between wireless LAN circuit 23 and each of access points 100-102 may use an electromagnetic wave as a communication medium or may use infrared radiation or the like as a communication medium.

Battery 41 is a secondary battery such as a NiCad battery, a nickel metal hydride battery or a lithium polymer battery to supply power to the enter mobile phone 1. Power switching portion 43 is provided between battery 41 and radio circuit 22 and between battery 41 and wireless LAN circuit 23. Power switching portion 43 is controlled by control portion 21 for switching between supply and cutoff of power from battery 41 to radio circuit 22 and switching between supply and cutoff of power from battery 41 to wireless LAN circuit 23.

Codec portion 28 decodes an audio signal input from radio circuit 22 or wireless LAN circuit 23, converts the decoded digital audio signal into an analog signal, amplifies the analog signal, and then outputs the amplified signal to audio switching portion 29. In addition, codec portion 28 receives an analog audio signal from microphone 13 or microphone terminal 16 through audio switching portion 29, converts the audio signal into a digital signal, encodes the digital signal, and then outputs the encoded audio signal to radio circuit 22 or wireless LAN circuit 23.

Audio switching portion 29 is controlled by control portion 21 to switch input/output of an audio signal to codec portion 28. Audio switching portion 29 outputs the audio signal accepted from codec portion 28 to one of earphone terminal 17, first speaker 11 and second speaker 12. When an earphone is connected to earphone terminal 17, the audio signal accepted from codec portion 28 is output to earphone terminal 17. When an earphone is not connected to earphone terminal 17, if mobile phone 1 is in a hands-free mode, the audio signal accepted from codec portion 28 is output to second speaker 12, and if mobile phone 1 is not in a hands-free mode, the audio signal accepted from codec portion 28 is output to first speaker 11. Mobile phone 1 is set in the hands-free mode by a user operating operation key 14. When mobile phone 1 is in a call state in the open style, even if the hands-free mode is not set, control portion 21 sets the hands-free mode when the state of mobile phone 1 changes to the closed style. Therefore, if the hands-free mode is not set when mobile phone 1 is in a call state in the open style, audio switching portion 29 outputs the audio signal accepted from codec portion 28 to first speaker 11, and when the state of mobile phone 1 changes to the closed style, audio switching portion 29 outputs the audio signal accepted from codec portion 28 to second speaker 12.

Audio switching portion 29 outputs an audio signal output by microphone 13 or microphone terminal 16 to codec portion 28. When a microphone is connected to microphone terminal 16, audio switching portion 29 outputs the audio signal accepted from microphone terminal 16 to codec portion 28, and when a microphone is not connected to microphone terminal 16, audio switching portion 29 outputs the audio signal accepted from microphone 13 to codec portion 28.

Display control portion 30 is controlled by control portion 21 and controls LCD 15 according to an instruction input from control portion 21 to cause an operation window or an image to appear on LCD 15. Images appearing on LCD 15 include moving images and still images.

A removable memory card 27A is attached to card I/F 27. Memory card 27A is, for example, Compact Flash, Smart Media (R), an SD (Secure Digital) memory card, a memory stick, MMC (Multi Media Card), an xD picture card, or the like.

Vibration portion 26 is controlled by control portion 21 and generates vibration by rotating a vibration plate fixed to a motor shaft at a position different from the center of gravity. Control portion 21 drives vibration portion 26 to execute an incoming call notification operation by vibration, for example, when an incoming call signal is received at radio circuit 22 or wireless LAN circuit 23.

Control portion 21 can access memory card 27A through card I/F 27. Although, in this example, a program to be executed in control portion 21 is stored in flash ROM 31, the program may be stored in memory card 27A and may be read from memory card 27A to be executed in control portion 21. A recording medium for storing a program is not limited to memory card 27A and may be a flexible disk, a cassette tape, an optical disk (CD-ROM (Compact Disc-ROM)/MO (Magnetic Optical Disc)/MD (Mini Disc)/DVD (Digital Versatile Disc)), an optical card, a semiconductor memory such as a mask ROM or EPROM, or the like. Alternatively, mobile phone 1 may be connected to the Internet via radio circuit 22 or wireless LAN circuit 23 so that a program is downloaded from the computer connected to the Internet and is then executed in control portion 21. Programs referred to herein include not only a program directly executable by control portion 21 but a source program, a compressed program, an encrypted program, and the like.

Camera 24 includes a lens and an optoelectronic transducer such as a CMOS (Complementary Metal Oxide Semiconductor) sensor to focus light collected by the lens onto the CMOS sensor. The CMOS sensor then optoelectronically converts the received light and outputs image data to control portion 21. Camera 24 is controlled by control portion 21 and starts picking up an image on an instruction from control portion 21 to output the obtained still image data or moving image data to control portion 21. Camera 24 includes an image processing circuit performing image processing for improving the image quality of image data and an A/D converter circuit converting image data from analog to digital. Control portion 21 outputs the still image data or moving image data output by camera 24 to display control portion 30 for display on LCD 15 or encodes the still image data or moving image data in a compression encoding scheme for storage into flash ROM 31 or memory card 27A attached to card I/F 27. Camera 24 picks up an image of the user of mobile phone 1 when mobile phone 1 functions as a television phone.

Figure 4:
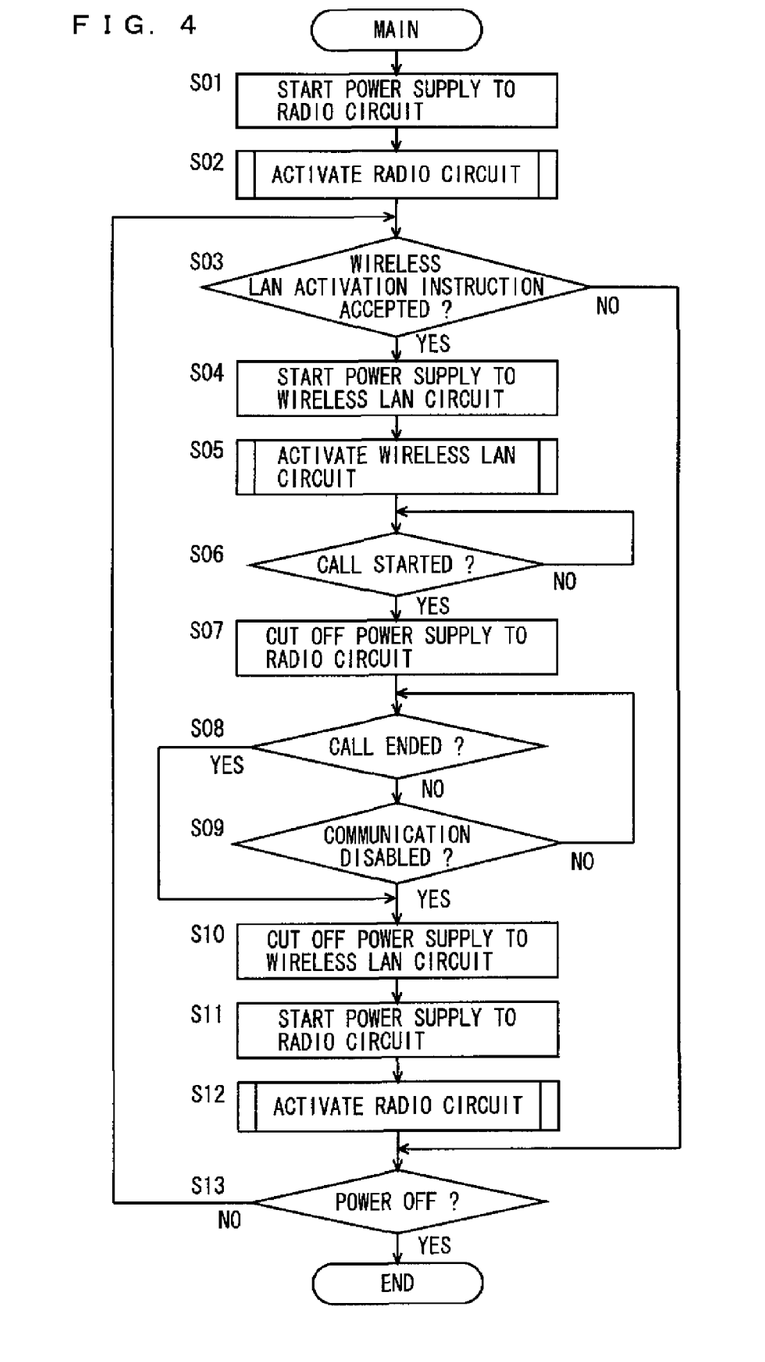
FIG. 4 is a flowchart showing an exemplary main process performed in a control portion.

FIG. 4 is a flowchart showing an exemplary main process performed in the control portion. The main process is a process performed by control portion 21 executing the program stored in flash ROM 31. The main process is executed by control portion 21 when mobile phone 1 is powered on. Referring to FIG. 4, after power-on, control portion 21 starts power supply to radio circuit 22 (step S01). Power switching portion 43 is controlled so that the power output terminal of battery 41 is connected with the power input terminal of radio circuit 22. Next, a radio circuit activation process for activating radio circuit 22 is executed (step S02). The radio circuit activation process, which will be described later, is a process of controlling radio circuit 22. Control portion 21 generates a process independent of a process of executing the main process, and the generated process executes the radio circuit activation process.

When a process of executing the radio circuit activation process is generated, in the next step S03, it is determined whether or not an instruction to active a wireless LAN is accepted. For example, when a user presses a predetermined key in operation keys 14 as a key for activating a wireless LAN, an instruction to activate a wireless LAN is accepted. If an instruction to activate a wireless LAN is accepted, the process proceeds to step S04, and if not, the process proceeds to step S13.

In step S13, it is determined whether or not an instruction to turn off the power is accepted. If an instruction to turn off the power is accepted, the process ends. If not, the process returns to step S03. If an instruction to turn off the power is accepted, the process of executing the radio circuit activation process, which is generated in step S02, is ended, and thereafter the process ends.

In step S04, power supply to wireless LAN circuit 23 is started. Power switching portion 43 is controlled so that the power output terminal of battery 41 is connected with the power input terminal of wireless LAN circuit 23. Then, a wireless LAN circuit activation process for activating wireless LAN circuit 23 is executed (step S05). The wireless LAN circuit activation process, which will be described later, is a process of controlling wireless LAN circuit 23. Control portion 21 generates a process independent of a process of executing the main process and a process of executing the radio circuit activation process, and the generated process executes the wireless LAN circuit activation process.

Then, it is determined whether or not a call is started in the wireless LAN circuit activation process (step S06). The process stands by until a call is started (NO in step S06), and if a call is started (YES in step S06), the process proceeds to step S07. The communication for a call in wireless LAN circuit 23 here means that an application program for allowing mobile phone 1 to function as a VoIP phone is executed in control portion 21. In wireless LAN circuit 23, communication is executed also by execution by control portion 21 of another application program, for example, a browser program for viewing a Web page, a navigation program, an email transmission/reception and edit program, a file download program, or the like. Here, it is determined whether or not, of these application programs, the application program for allowing the mobile phone to function as a VoIP phone is executed by control portion 21 and a call is then started. This allows an incoming call to be detected in radio circuit 22 when another application program is executed.

In step S07, power supply to radio circuit 22 is cut off. Power switching portion 43 is controlled so that connection between the power output terminal of battery 41 and the power input terminal of radio circuit 22 is cut off. Here, the process of executing the radio circuit activation process, which is generated in step S02, is ended. A call via wireless LAN circuit 23 (call by the IP phone) and a call via radio circuit 22 (call by the mobile phone) are not performed simultaneously. Therefore, after a call via wireless LAN circuit 23 is started, there is no need for detecting an incoming call by radio circuit 22, so that power supply to radio circuit 22 is cut off. This avoids unnecessary power consumption by radio circuit 22.

Then, it is determined whether or not the call is ended in the wireless LAN circuit activation process activated in step S05 (step S08). If the call is ended, the process proceeds to step S10, and if not ended, the process proceeds to step S09. In step S09, it is determined whether or not communication is disabled in wireless LAN circuit 23 in the wireless LAN circuit activation process activated in step S05. If communication is disabled, the process proceeds to step S10, and if not, the process proceeds to step S08.

In step S10, power supply to wireless LAN circuit 23 is cut off. Power switching portion 43 is controlled so that connection between the power output terminal of battery 41 and the power input terminal of wireless LAN circuit 23 is cut off. Here, the process of executing the wireless LAN circuit activation process, which is generated in step S05, is ended. After communication by wireless LAN circuit 23 is disabled, there is no need for supplying power to wireless LAN circuit 23. Therefore, by cutting off power supply to wireless LAN circuit 23, unnecessary power consumption by wireless LAN circuit 23 can be avoided.

Then, similar to step S01 and step S02, power supply to radio circuit 22 is started (step S11), and the radio circuit activation process for activating radio circuit 22 is executed (step S12). The process then proceeds to step S13. When wireless LAN circuit 23 becomes incommunicable, power is immediately supplied to radio circuit 22, so that a period of time during which radio circuit 22 is incommunicable can be shortened as much as possible.

In step S13, it is determined whether or not an instruction to turn off the power is accepted. If an instruction to turn off the power is accepted, the process ends, and if not, the process returns to step S03.

In the present embodiment, wireless LAN circuit 23 is activated on condition that an instruction to activate the wireless LAN is accepted (YES in step S03) after mobile phone 1 is powered on. However, wireless LAN circuit 23 may be activated after mobile phone 1 is powered on without accepting an instruction to activate the wireless LAN. In this case, step S03 is not necessary.

Figure 5:
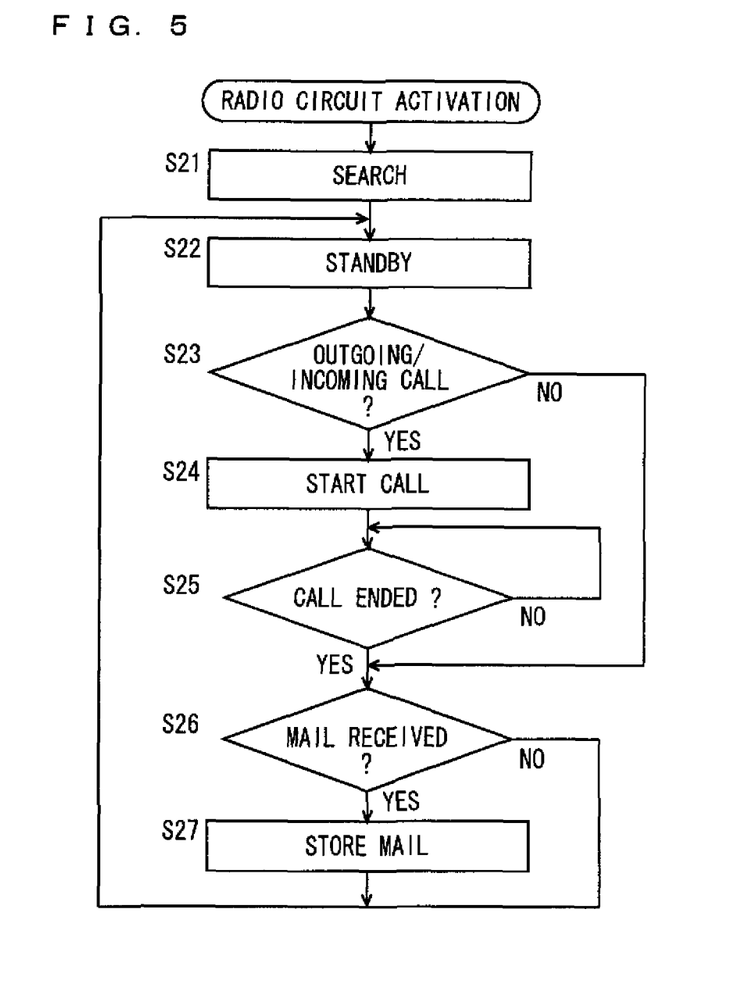
FIG. 5 is a flowchart showing an exemplary flow of a radio circuit activation process.

FIG. 5 is a flowchart showing an exemplary flow of the radio circuit activation process. The radio circuit activation process is a process executed by a process newly generated in step S02 and step S12 in FIG. 4. Referring to FIG. 5, control portion 21 controls radio circuit 22 to allow it start a search operation (step S21). The search operation here is called 1X search, which is an operation of connecting mobile phone 1 to first network 202 to enable a call. Specifically, radio circuit 22 communicates with base station apparatus 201 to transmit/receive information necessary for calls.

Next, the process enters a standby state (step S22), and when an outgoing or incoming call is originated (YES in step S23), the process proceeds to step S24. If neither an outgoing nor incoming call is originated (NO in step S23), the process proceeds to step S26. An outgoing call is accepted by control portion 21 when the user of mobile phone 1 operates the operation keys to input a telephone number. An incoming call is accepted by control portion 21 when radio circuit 22 receives an incoming call signal from base station apparatus 201. In step S24, the line is connected and a call is started.

In step S25, it is determined whether or not the call is ended. The process enters a standby state until the call is ended, and if the call is ended, the process proceeds to step S26. The end of the call is input to mobile phone 1 by the user pressing the call end button of the operation key and is accepted by control portion 21. Alternatively, when radio circuit 22 receives a signal indicating the end of the call from base station apparatus 201, control portion 21 accepts the end of the call from radio circuit 22.

In step S26, it is determined whether or not an email is received. If an email is received, the process proceeds to step S27, and if not, the process returns to step S22 and enters a standby state. In step S27, the received email is stored in flash ROM 31, and the process returns to step S22.

In this manner, when radio circuit 22 receives an email from base station apparatus 201 during execution of the radio circuit activation process, the email is stored in flash ROM 31, and when an outgoing or incoming call is originated, a call is started.

Figure 6:
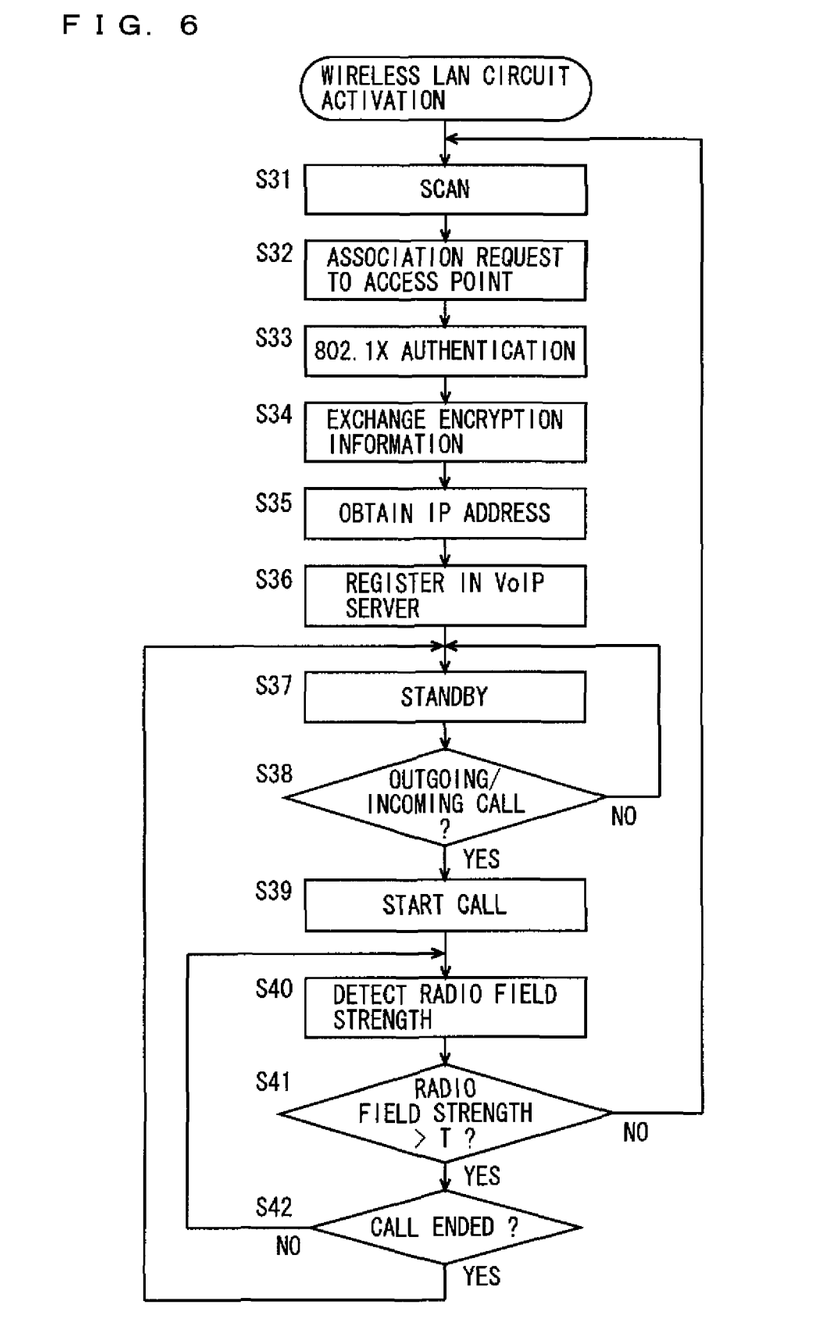
FIG. 6 is a flowchart showing an exemplary flow of a wireless LAN circuit activation process.

FIG. 6 is a flowchart showing an exemplary flow of the wireless LAN circuit activation process. The wireless LAN circuit activation process is a process executed by a process newly generated in step S05 in FIG. 4. Referring to FIG. 6, control portion 21 allows wireless LAN circuit 23 to start scanning in order to detect a connectable access point (step S31). Then, an access point to connect is determined based on the radio field strength detected by the scanning, and Association Request is transmitted to that access point (step S32). The access point to connect may be determined, for example, on an access point having the maximum radio field strength. Here, Association Request is transmitted to access point 100, by way of illustration. Upon reception of Association Request, access point 100 executes an authentication process defined by the IEEE802.1X standard in order to authenticate mobile phone 1. In response, control portion 21 allows wireless LAN circuit 23 to transmit information necessary for the authentication process to access point 100 (step S33). If authentication is successful in access point 100, control portion 21 controls wireless LAN circuit 23 to exchange encryption information including an encryption key with access point 100 (step S34). The protocol for exchanging encryption information is known as 4-way handshake.

Then, control portion 21 obtains an IP address (step S35). Specifically, wireless LAN circuit 23 is controlled so that an IP address is obtained from the DHCP server connected to the second network. Then, the obtained IP address is registered in VoIP server 112 (step S36). Control portion 21 controls wireless LAN circuit 23 to allow it to transmit MAC address assigned to mobile phone 1 and the obtained IP address to VoIP server 112. Therefore, mobile phone 1 is registered in VoIP server 112 and functions as an IP phone in the second network.

Then, control portion 21 enters a standby state (step S37), and when an outgoing or incoming call is originated (YES in step S38), the process proceeds to step S39. If neither an outgoing nor incoming call is originated (NO in step S38), the process returns to step S37 and enters a standby state. An outgoing call is accepted by control portion 21 when the user of mobile phone 1 operates the operation keys to input an extension number. An incoming call is accepted by control portion 21 when an incoming call signal is received from access point 100. In step S39, the line is connected and a call is then started. Control portion 21 generates an IP packet including the IP address obtained in step S35 and an audio signal input from codec portion 28 during call and outputs the IP packet to wireless LAN circuit 23 for transmission.

When a call is started in step S39, control portion 21 detects the radio field strength of a radio wave during call (step S40). In step S41, it is determined whether or not the detected radio field strength is larger than a predetermined threshold value T. If the radio field strength is larger than the threshold value, the process proceeds to step S42, and if not, the process returns to step S31.

In step S42, it is determined whether or not the call is ended. If the call is ended, the process returns to step S37, and if not ended, the process returns to step S40. The end of the call is input to mobile phone 1 when the user presses the call end button of the operation key and is accepted by control portion 21. Alternatively, when wireless LAN circuit 23 receives a signal indicating the end of the call from access point 100, control portion 21 accepts the end of the call from wireless LAN circuit 23.

In the present embodiment, whether communication by wireless LAN circuit 23 is disabled or not is determined by comparing the radio field strength of a radio wave received by wireless LAN circuit 23 with a threshold value. However, it may be determined by calculating a bit error rate of a signal demodulated in wireless LAN circuit 23 and comparing the bit error rate with a threshold value.

As described above, mobile phone 1 as a voice communication apparatus in the present embodiment cuts off power supply to radio circuit 22 if communication for a call by wireless LAN circuit 23 is established when power is supplied to both radio circuit 22 and wireless LAN circuit 23, thereby avoiding unnecessary power consumption in radio circuit 22 and reducing power consumption. In other words, power consumption can be reduced while an incoming call is detected in each of radio circuit 22 and wireless LAN circuit 23.

In addition, after power supply to radio circuit 22 is cut off, when communication established by wireless LAN circuit 23 is disabled, power is immediately supplied to radio circuit 22. Therefore, a period of time during which radio circuit 22 is incommunicable can be shortened as much as possible.

In addition, after power supply to radio circuit 22 is cut off, when communication established by wireless LAN circuit 23 is disabled, power supplied to wireless LAN circuit 23 is cut off. Therefore, unnecessary power consumption in wireless LAN circuit 23 can be avoided and power consumption can be reduced.

Here, if communication for a call by radio circuit 22 is established when power is supplied to both radio circuit 22 and wireless LAN circuit 23, mobile phone 1 may cut off power supply to wireless LAN circuit 23. In this case, unnecessary power consumption in wireless LAN circuit 23 can be avoided and power consumption can be reduced. Moreover, if communication for a call by one of radio circuit 22 and wireless LAN circuit 23 is established when power is supplied to both radio circuit 22 and wireless LAN circuit 23, mobile phone 1 may cut off power supply to another. In this case, unnecessary power consumption in a circuit to which power supply is cut off, of radio circuit 22 and wireless LAN circuit 23, can be avoided and power consumption can be reduced.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A voice communication apparatus comprising:
a first radio communication portion;
a second radio communication portion different from said first radio communication portion; and
a power control portion to control power supply to said first radio communication portion and said second radio communication portion, wherein
said power control portion includes a first cutoff portion to cut off power supply to said first radio communication portion if communication for a call by said second radio communication portion is established when power is supplied to both said first radio communication portion and said second radio communication portion, and
said power control portion further includes a supply start portion to immediately supply power to said first radio communication portion if communication established by said second radio communication portion is disabled after power supply to said first radio communication portion is cut off, wherein said power control portion includes a second cutoff portion to cut off power supplied to said second radio communication portion if communication established by said second radio communication portion is disabled after power supply to said first radio communication portion is cut off, and wherein the voice communication apparatus is within a range communicable by both the first radio communication unit and the second radio communication unit.

2. The voice communication apparatus according to claim 1, further comprising:
a radio field strength detection portion to detect a radio field strength of a radio wave received by said second radio communication portion during communication; and
a communication state detection portion to detect whether communication is disabled or not, based on said detected radio field strength.

3. The voice communication apparatus according to claim 1, further comprising:
a radio field strength detection portion to detect a radio field strength of a radio wave received by said second radio communication portion during communication; and
a communication state detection portion to detect whether communication is disabled or not, based on said detected radio field strength.

4. The voice communication apparatus according to claim 1, further comprising:
an error rate calculation portion to calculate an error rate of data received by said second radio communication portion; and
a communication state detection portion to detect whether communication is disabled or not, based on said calculated error rate.

5. The voice communication apparatus according to claim 1, wherein said power control portion includes a second cut-off portion to cut off power supplied to said second radio communication portion if communication established by said second radio communication portion is disabled after power supply to said first radio communication portion is cut off.

6. The voice communication apparatus according to claim 5, further comprising:
a radio field strength detection portion to detect a radio field strength of a radio wave received by said second radio communication portion during communication; and
a communication state detection portion to detect whether communication is disabled or not, based on said detected radio field strength.

7. The voice communication apparatus according to claim 5, further comprising:
an error rate calculation portion to calculate an error rate of data received by said second radio communication portion; and
a communication state detection portion to detect whether communication is disabled or not, based on said calculated error rate.

8. A radio circuit activation method performed in a voice communication apparatus including a first radio communication portion and a second radio communication portion different from said first radio communication portion, comprising the steps of:
detecting that communication for a call by said second radio communication portion is established;
cutting off power supply to said first radio communication portion if establishment of communication with said second radio communication portion is detected when power is supplied to both said first radio communication portion and said second radio communication portion;
immediately supplying power to said first radio communication portion if communication established by said second radio communication portion is disabled after power supply to said first radio communication portion is cut off; and
cutting off power supplied to said second radio communication portion if communication established by said second radio communication portion is disabled after power supply to said first radio communication portion is cut off, wherein the voice communication apparatus is within a range communicable by both the first radio communication portion and the second radio communication portion.

9. The radio circuit activation method according to claim 8, further comprising the steps of:
detecting a radio field strength of a radio wave received by said second radio communication portion during communication; and
detecting whether communication is disabled or not, based on said detected radio field strength.

10. The radio circuit activation method according to claim 8, further comprising the steps of:
detecting a radio field strength of a radio wave received by said second radio communication portion during communication; and
detecting whether communication is disabled or not, based on said detected radio field strength.

11. The radio circuit activation method according to claim 8, further comprising the steps of:
calculating an error rate of data received by said second radio communication portion; and
detecting whether communication is disabled or not, based on said calculated error rate.

12. The radio circuit activation method according to claim 8, further comprising the step of cutting off power supplied to said second radio communication portion if communication established by said second radio communication portion is disabled after power supply to said first radio communication portion is cut off.

13. The radio circuit activation method according to claim 12, further comprising the steps of:
detecting a radio field strength of a radio wave received by said second radio communication portion during communication; and
detecting whether communication is disabled or not, based on said detected radio field strength.

14. The radio circuit activation method according to claim 12, further comprising the steps of:
calculating an error rate of data received by said second radio communication portion; and
detecting whether communication is disabled or not, based on said calculated error rate.

15. A non-transitory computer-readable medium storing thereon a radio circuit activation program for controlling a voice communication apparatus,
said voice communication apparatus including
a first radio communication portion; and
a second radio communication portion different from said first radio communication portion,
said radio circuit activation program configured to perform a method of:
detecting that communication for a call by said second radio communication portion is established;
cutting off power supply to said first radio communication portion if establishment of communication with said second radio communication portion is detected when power is supplied to both said first radio communication portion and said second radio communication portion; and immediately supplying power to said first radio communication portion if communication established by said second radio communication portion is disabled after power supply to said first radio communication portion is cut off, wherein said first cutoff portion cuts off power supply to said first radio communication portion in a case where the voice communication apparatus is within a range communicable by both the first radio communication portion and the second radio communication portion.

16. The radio circuit activation method according to claim 8, wherein said cutting off the power supply is performed in a case where the voice communication apparatus is within a range communicable by both the first radio communication portion and the second radio communication portion.

17. The non-transitory computer-readable medium according to claim 15, wherein said cutting off the power supply is performed in a case where the voice communication apparatus is within a range communicable by both the first radio communication portion and the second radio communication portion.

18. A voice communication system, comprising:

a first communication unit;

a second communication unit;

a cutoff unit configured to cut off power supply to said first communication unit if communication for a call by said second communication unit is established when power is supplied to both said first communication unit and said second communication unit; and a supply start unit configured to immediately supply power to said first communication unit if communication established by said second communication unit is disabled after power supply to said first communication unit is cut off, wherein said cutoff unit cuts off power supply to said first radio communication portion in a case where the voice communication system is within a range communicable by both the first communication unit and the second communication unit.

* * * * *